United States Patent [19]

Kaku et al.

[11] Patent Number: 4,725,910
[45] Date of Patent: Feb. 16, 1988

[54] ROTARY MAGNETIC HEAD ASSEMBLY

[75] Inventors: Nobuyuki Kaku; Atsuo Osawa, both of Yokohama; Masanori Kochi; Hitoshi Takizawa, both of Katsuta, all of Japan

[73] Assignees: Hitachi, Ltd.; Hitachi Video Eng. Inc., both of Japan

[21] Appl. No.: 799,021

[22] Filed: Nov. 18, 1985

[30] Foreign Application Priority Data

Nov. 20, 1984 [JP] Japan ................... 59-243166

[51] Int. Cl.⁴ .................. G11B 5/53; G11B 21/21; G11B 21/04
[52] U.S. Cl. .................. 360/130.24; 360/104; 360/107
[58] Field of Search ............... 360/128, 129, 130.24, 360/107, 104

[56] References Cited

U.S. PATENT DOCUMENTS 4,306,262 12/1981 Takano ................... 360/130.24

FOREIGN PATENT DOCUMENTS 58-45654 3/1983 Japan ................... 360/130.24
58-58737 12/1983 Japan .

Primary Examiner—Robert S. Tupper
Attorney, Agent, or Firm—Antonelli, Terry & Wands

[57] ABSTRACT

A rotary cylinder device for helical scan type magnetic recording/reproducing apparatus including a rotary cylinder having an axis of rotation arranged in opposition a stationary cylinder in the direction of the axis of rotation with a small gap therebetween. The rotary cylinder has an end surface facing the stationary cylinder and an outer peripheral surface, recesses formed in the end surface and opening in the outer peripheral surface so as to extend therefrom radially inwardly over a small distance. Each of the recesses has a leading end wall and a trailing end wall, as viewed in the direction of rotation of the rotary cylinder. Magnetic heads are fixed to the rotary cylinder and are positioned in the recesses and have outer extremities projecting beyond the outer peripheral surface of the rotary cylinder. The distance between the leading end wall and the trailing end wall of each recess progressively decreases towards the axis of rotation of the rotary cylinder so that the distance is greatest at the outer end of the recess adjacent the magnetic head and the smallest at the inner end of the recess remote from the magnetic head.

4 Claims, 10 Drawing Figures

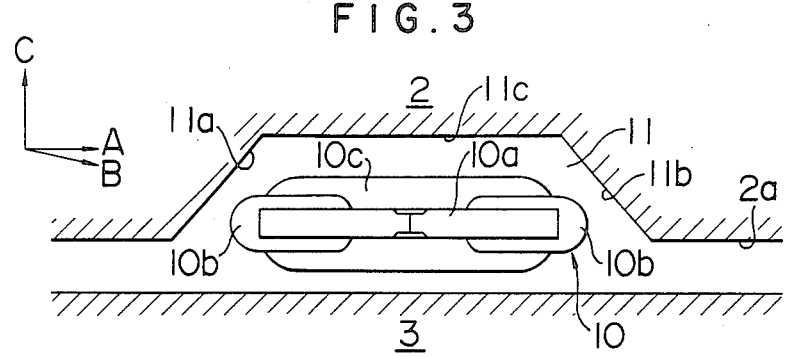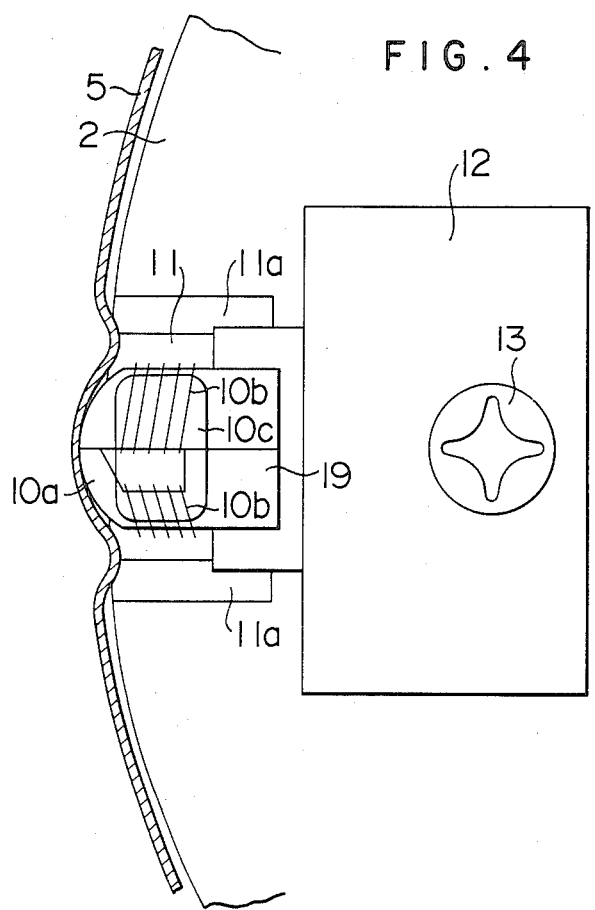

ROTARY MAGNETIC HEAD ASSEMBLY

BACKGROUND OF THE INVENTION

Field of the Invention

The present invention relates to a helical scan magnetic recording/reproducing apparatus and, more particularly, to a rotary cylinder device having magnetic heads which are held in contact with a magnetic tape so as to scan the tape as a rotary cylinder rotates.

Generally, a helical scan type magnetic recording/reproducing apparatus has a rotary cylinder device carrying a plurality of magnetic heads which are adapted to be successively and alternatingly brought into contact with a magnetic tape, thereby forming recording tracks on the magnetic tape or scanning the tracks for the purpose of reproduction.

A known rotary cylinder device used in magnetic recording/reproducing apparatus of the type described has a rotary shaft and a rotary cylinder which is disposed in opposition to a stationary cylinder leaving therebetween a slight gap in an axial direction of the rotary shaft. The rotary cylinder has an end surface facing the stationary cylinder and an outer peripheral surface. Recesses are formed in the end surface of the rotary cylinder and open in an outer peripheral surface and extend therefrom radially inwardly of the rotary cylinder over a small distance. Each recess has a leading end surface and a trailing end surface as viewed in the direction of rotation of the rotary cylinder. Magnetic heads are fixed in the recesses of the rotary cylinder with outer extremities thereof projecting beyond the outer peripheral surface of the rotary cylinder.

A disadvantage of the above proposed rotary cylinder device resides in the fact that air is induced into the recesses during operation of the rotary cylinder device to cause the magnetic tape to contact the surfaces of the recesses, resulting in vibration and damage of the tape.

SUMMARY OF THE INVENTION

Accordingly, an object of the invention is to provide a rotary cylinder device which is capable of suppressing vibration and damage to the tape due to induction of air into the recesses, thereby ensuring a high quality of the reproduced image while avoiding the above-described disadvantage encountered in the prior art.

In accordance with the present invention, a rotary head device for a magnetic recording/reproducing apparatus there is provided comprising a rotary cylinder having an axis of rotation arranged in opposition to a stationary cylinder in a direction of the axis of rotation with a small gap therebetween. The rotary cylinder includes an end surface facing the stationary cylinder with an outer peripheral surface, and recesses formed in the end surface and opening in the outer peripheral surface to extend therefrom radially inwardly over a small distance. Each of the recess has a leading end wall, and a trailing end wall as viewed in the direction of rotation of the rotary cylinder, and magnetic heads are fixed to the rotary cylinder and positioned in the recesses and have outer extremities projecting beyond the outer peripheral surface of the rotary cylinder. A distance between the leading end wall and the trailing end wall of each recess is progressively decreased towards the axis of rotation of the rotary cylinder so that the distance is greatest at the outer end of the recess adjacent the magnetic head and the smallest at the inner end of the recess remote from the magnetic head.

The above and other objects, features and advantages of the invention will become clear from the following description of the preferred embodiments when taken in connection with the accompanying drawings.

BRIEF DESCRIPTION OF THE DRAWINGS

FIG. 3 is an enlarged view of a portion of the rotary cylinder, showing in particular one of recesses formed in the rotary cylinder;

FIG. 4 is a partially schematic view of the behavior of a magnetic tape running in the vicinity of the recess;

DETAILED DESCRIPTION OF THE PREFERRED EMBODIMENTS

Figure 9:
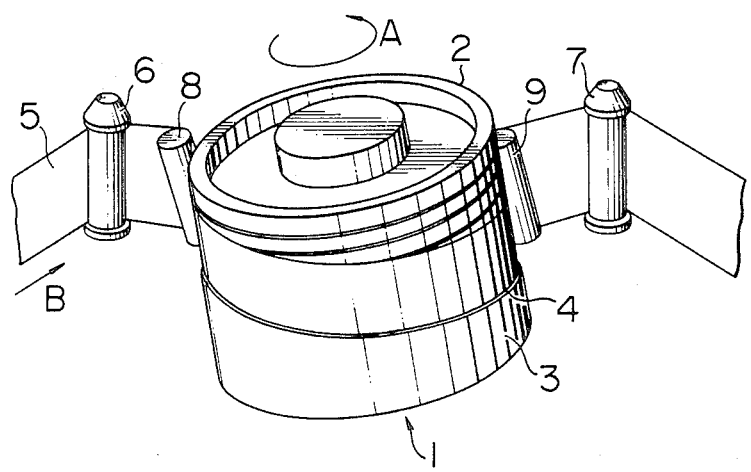
FIG. 9 is a perspective view of a rotary cylinder device illustrating a general positional relationship between a magnetic tape and the rotary cylinder device in a helical scan magnetic recording/reproducing apparatus.

Referring now to the drawings wherein like reference numerals are used throughout the various views to designate like parts and, more particularly, to FIG. 9, according to this figure a rotary cylinder device generally designated by the reference numeral 1 in an ordinary a helical scan type magnetic recording/reproducing apparatus includes a rotary cylinder device 1 has a rotary cylinder 2 and a stationary cylinder 3 disposed in opposition to each other in the direction of axis of rotation of the rotary cylinder 2. The rotary cylinder 2 mounts a pair of magnetic heads, while the stationary cylinder 3 is provided with a spiral tape lead 4 on an outer peripheral surface thereof.

A magnetic tape 5 extracted from a tape cassette (not shown), is led along a guide roller 6 and a sland guide 8, and is spirally wound around the rotary cylinder 2 and the stationary cylinder 3 over about 180° with its lower edge contacting the tape lead 4. Then, the magnetic tape 5 is further led into the cassette through a slant guide 9 and a guide roller 7.

As the magnetic tape 5 is driven in the direction of an arrow B by a tape driving system (not shown) for recording or reproduction, the magnetic tape 5 turns around the guide roller 6 and runs in contact with the outer peripheral surfaces of the rotary cylinder 2 and the stationary cylinder 3. During running on the cylinders 2, 3, any undesirable twisting of the magnetic tape 5 is avoided by virtue of the slant guides 8 and 9. The magnetic tape 5 then turns around the guide roller 7 and is taken up by a take-up reel in the cassette. The rotary cylinder 2 is rotated in the direction of an arrow A by a cylinder motor (not shown), so that two magnetic heads on the rotary cylinder 2 alternatingly contact the magnetic tape 5 over 180° rotation of the rotary cylinder 2.

In this rotary cylinder device 1, a lubricating layer, constituted by an air layer, is formed between the outer peripheral surfaces of the rotary and stationary cylinders 2,3 and the magnetic tape 5 so that the magnetic tape 5 materially floats above the outer peripheral surfaces of the rotary and stationary cylinders 2 and 3. In order to ensure that the magnetic tape, floating above the outer peripheral surface of the cylinders is contacted by the magnetic heads, the magnetic heads are set in recesses formed in the axial end surface of the rotary cylinder 2 facing the stationary cylinder 3, such that an outer extremity of the magnetic heads project beyond the outer peripheral surface of the rotary cylinder 2.

Figure 10:
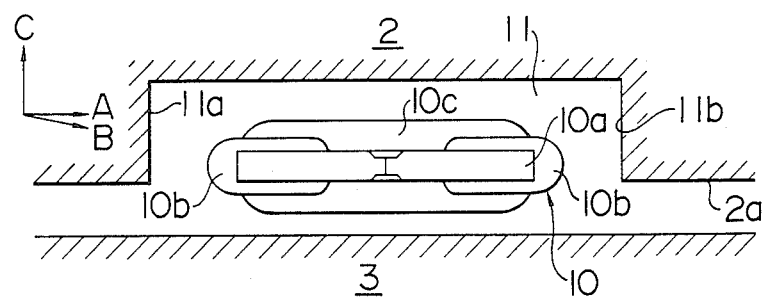
FIG. 10 is a view similar to FIG. 3, showing an example of the configuration of a recess formed in a prior art rotary cylinder.

As shown in FIG. 10, a magnetic head 10 is provided along with a head core 10a, coils 10b, and a resin portion 10c. A recess 11 is formed in the end surface 2a of the rotary cylinder 2 facing the stationary cylinder 3. The end of the magnetic head 10, fixed in the rotary cylinder 2, projects from the outer peripheral surface of the rotary cylinder 2 through the recess 11. The projected end of the magnetic head 10 contacts the magnetic tape 5. In order enable the magnetic head 10 to be easily and precisely attached to the rotary cylinder 10, the recess 11 is required to have a certain area.

During the operation of the rotary head device, the rotary cylinder 2 rotates at a high peripheral velocity in the direction of the arrow A, while the tape runs in a direction of an arrow B at a velocity which is negligibly small as compared with the peripheral velocity of the rotary cylinder 2. Consequently, air is introduced into the space between the rotary cylinder 2 and the magnetic tape 5 so as to form an air layer of positive pressure therebetween, thereby causing the magnetic tape 5 to float above the outer peripheral surface of the rotary cylinder 2.

However, in an area of the recess 11, the air flows into the recess 11 so that a negative pressure is established to generate a suction force for drawing the magnetic tape inwardly of the recess 11. Presuming that the rotary cylinder 2 is rotating in the direction of the arrow A, the magnetic tape 5 is drawn inwardly of the recess first at the region between the end wall 11b of the recess 11 and the leading end of the magnetic head 10 and, after forced out by the magnetic head 10, drawn again in the region between the trailing end of the magnetic head 10 and the end wall 11a. The drawn-in magnetic tape 5 inevitably contacts the end walls 11a, 11b and is rubbed by the edges of these end walls 11a, 11b, i.e., the boundaries between the end surfaces and the outer peripheral surface of the rotary cylinder 2, particularly by the edge of the end surface 11a, especially when minute projections such as burs exist on these edges. Consequently, the magnetic surface of the magnetic tape 5 is damaged resulting in a degradation of the quality of the reproduced image.

To attempt to avoid this problem, in, for example, Japanese Patent Publication No. 58737/1983 a method is proposed wherein the edges of the end walls of the recess 11 are plastically deformed inwardly of the recess 11 by a punch, thereby preventing any damage of the magnetic tape 5. According to this method, the edges of the walls of the recess 11 are rounded and deformed inwardly of the recess 11, so that the risk of damaging of the magnetic tape 5 is suppressed by virtue of the fact that the magnetic tape 5 gently contacts these edges even though the magnetic tape 5 is drawn into the recess 11 and, therefore, the undesirable degradation of the quality of reproduced image can be avoided.

However, the proposed method cannot prevent the suction of the magnetic tape 5 itself. On the other hand, turbulent flow of air is generated in the recess 11 due to collision of air with the magnetic head 10 and the end walls 11a, 11b of the recess 11, resulting in a fluctuation of the negative air pressure in the recess 11. The fluctuation of the negative air pressure causes a vibration of magnetic tape 5 drawn into the recess 1 and, the greater the turbulence, the greater the magnitude of vibration.

It is to be understood also that the greater the area of the recess, the greater the amount of suction of the magnetic tape 5 into the recess 11, which, in turn, causes a closer contact between the edges of the recess walls 11a, 11b and the magnetic tape 5. This obviously enhances the tendency of vibration of the magnetic tape 5 due to rubbing by the edges of the recess walls 11a, 11b. The rounding of the edges of the recess walls 11a, 11b proposed in the above-mentioned Japanese Patent Publication materially increases the area of the recess 11, so that the amount of suction of the magnetic tape 5 into the recess 11 is materially increased and the vibration of the magnetic tape 5 is enhanced accordingly. The vibration of the magnetic tape causes a fluctuation in the state of scanning of the magnetic tape 5 by the magnetic head 10, particularly the tracking condition and the pressure at which the magnetic head 10 is pressed to the magnetic tape 5, causing a degradation in the quality of the reproduced image.

The current trend for higher recording density and longer recording time requires magnetic tapes 5 having smaller thickness and rigidity. Such magnetic tapes 5 having a reduced thickness and rigidity increases the tendency of the suction of the magnetic tape 5 into the recess 11. Therefore, when the recess 11 has a large area as in the conventional device, the vibration of the magnetic tape 5 is amplified to seriously deteriorate the quality of the reproduced image.

Figure 1:
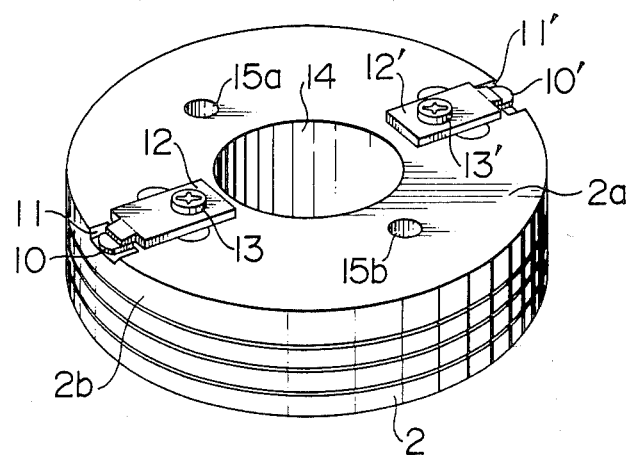
FIG. 1 is a perspective view of a rotary cylinder incorporated in a first embodiment of the rotary cylinder device of the invention, taken in the direction of arrows I—I in FIG. 2.
Figure 2:
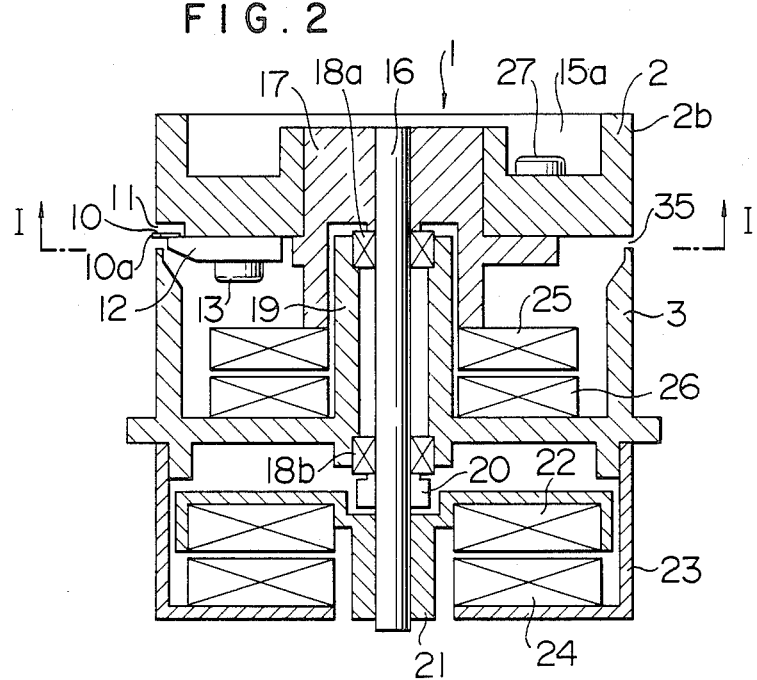
FIG. 2 is a vertical sectional view of the whole portion of the first embodiment taken along the axis thereof.

In accordance with the present invention, as shown in FIGS. 1–4, and, in particular, FIG. 2, a rotary shaft 16 is press-fitted at its one end into a central bore of a disk 17 and at an opposite end to a central hole of the rotor holder 21, so that the disk 17 and the rotary holder 21 are integrally carried by the rotary shaft 16. The rotary shaft 16 is carried at its central portion by a bearing support portion 19 in the center of the stationary cylinder 3 through the intermediary of bearings 18a, 18b. Therefore, the disk 17 and the rotor holder 21 are rotatably mounted on the stationary cylinder 3 through of the rotary shaft 16 and a stopper 20 is provided.

The disk 17 fits in the central bore 14 (FIG. 1) of the rotary cylinder 2, with a fastener, such as, for example, screw 27 (FIG. 2) being accommodated in a threaded hole 15a in the cylinder 2, thereby fixing the rotary cylinder 2 to the disk 17. The rotary cylinder 2 and the stationary cylinder 3 oppose each other leaving a very small gap 35 (FIG. 2) therebetween. Head bases 12, 12' each mounting a magnetic head 10, 10' are secured by fasteners such as, for example, screws 13, 13' to the end surface 2a, i.e., the bottom surface, of the rotary cylinder 2 adjacent the stationary cylinder 3. Recesses 11, 11' are formed in the end or bottom surface 2a of the rotary cylinder 2 and open in the outer peripheral surface 2b so as to extend therefrom radially inwardly over a small distance. The magnetic heads 10, 10' mounted on the head bases 12 are positioned above the recesses 11, 11' and extend radially outwardly so that outer extremities 10a project beyond the outer peripheral surface 2b of the rotary cylinder 2. The gap 35 between the rotary cylinder 2 and the stationary cylinder 3 must be very small, otherwise the gap 35 will disturb the layer of pressurized air between the outer peripheral surfaces of the rotary and stationary cylinders 2,3 and the magnetic tape 5. This in turn requires the provision of the recesses 11, in order to permit the extremities 10a of the magnetic head 10 to project beyond the outer peripheral surface of the rotary cylinder 2.

On the other hand, an annular rotor 22, made of a magnet, is secured to the rotor holder 21, while an annular stator 24, constituted by a coil, is mounted on a stator holder 23 secured to the stationary cylinder 3 in opposition to the rotor 22. As the coil of the stator 24 is energized with a predetermined driving current, the rotor 22 is rotated by electromagnetic action between the stator 24 and the rotor 22, so that the shaft 16 and, hence, the rotary cylinder 2 are rotated.

A rotor 25 of a rotary transformer is fixed to the end of the stationary cylinder 3 adjacent the stationary cylinder 3 in opposition to a stator 26 of the rotary transformer fixed to the stationary cylinder 3. The exchange of the recording signals or reproduced signals between the magnetic heads 10, 10' and the external circuit is conducted through the rotor 25 and the stator 26.

As is shown in FIG. 1, two head bases 12, 12' mounting the magnetic heads 10, 10' are secured to the rotary cylinder 2 by fasteners such as, for example, screws 13, 13' precisely at 180° intervals therebetween. It will be seen also that two recesses 11, 11' are formed to open in the outer peripheral surface of the rotary cylinder 2 so as to allow the outer extremities of the magnetic head 10, 10' to project beyond the outer peripheral surface 2b of the rotor cylinder 2. When viewed from the outer peripheral side of the rotary cylinder 2 towards the radially inner side of the same, each of the recesses 11, 11' exhibit a trapezoidal configuration as will be explained later in connection with FIG. 3, unlike the conventional recess which exhibits a substantially rectangular configuration.

Although only one screw 27 is shown in FIG. 2 for fixing the rotary cylinder 2 to the disk 17, the illustrated embodiment actually employs two screws 27 which are driven into respective holes 15a, 15b formed in the rotary cylinder 2 for fixing the rotary cylinder 2 to the disk 17, as will be seen from FIG. 1. From FIG. 2, it will be seen that the disk 17 is received in the central bore 14 of the rotary cylinder 2.

In FIG. 3, the size of the recess 11, as measured in the direction of rotation of the rotary cylinder 2, i.e., the direction of an arrow A, will be referred to as "breadth" of the recess 11, while the size of the same as measured in the direction of axis of rotation of the rotary disk 2, i.e., the direction of an arrow C, will be referred to as "depth" of the recess 11.

The magnetic head 10 has a head core 10a on which a coil 10b is fixed integrally by a resin portion 10c. According to the invention, the breadth and the depth of the recess 11 are so determined that the magnetic head 10 may be fixed to the rotary cylinder 2 with a sufficient margin of positional precision such that the outer extremity of the magnetic head 10 projects from the outer peripheral surface of the rotary cylinder 2, while reducing the area of the recess 11 as much as possible.

The leading end surface 11b and the trailing end surface 11a of the recess 11, as viewed in the direction of rotation of the rotary cylinder 2, are tapered with respect to the end surface 2a of the rotary cylinder 2 adjacent to stationary cylinder 3. More specifically, the recess 11 exhibits such a trapezoidal configuration that the breadth is greatest at the outer end near the magnetic head 10 and is progressively decreased along the axis away from the magnetic head 10, i.e., in the direction of the arrow C, when viewed from the outer peripheral side towards the radially inner end, i.e., from the left side to the right side in FIG. 1.

The recess 11 of the described configuration has an area which is further decreased from the area of the conventional recess 11 shown in FIG. 10, so that the amount of suction of the magnetic tape 5 into the recess 11 is advantageously reduced. In addition, since a large angle is formed between both end walls 11a, 11b of the recess 11 and the bottom surface 11c of the same, the flow of air in the recess is made comparatively gently, so that the turbulence of the air is reduced thereby remarkably suppressing the vibration tendency of the magnetic tape 5.

It is not always necessary that the end surfaces 11a, 11b of the recess 11 be flat as shown in FIG. 3. Namely, the end surfaces 11a, 11b may be curved in, for example, arcuate form, provided that the breadth of the recess is progrsssively decreased along the axis, i.e., in the direction of the arrow C away from the magnetic head 10.

The rotary cylinder 2 is formed by roughly forming a blank with a required diameter, forming the recesses 11, and then grinding the peripheral surface of the rotary cylinder 2 by a cutting tool (not shown). It is to be understood that, since the end surfaces 11a, 11b of the recess 11 are tapered with respect to the cutting tool, the cutting tool does not contact the end surfaces 11a, 11b in a direction perpendicular thereto, so that any minute projections such as burs can be removed easily by the cutting tool. FIGS. 3 and 4 show only one of the recesses 11 which is shown at the left side in FIG. 1. It will be clear to those skilled in the art that the recess 11' provided on the right side of FIG. 1 has the same configuration as the illustrated recess 11.

As described above, the embodiment of FIGS. 1–4 is capable of suppressing the suction of the magnetic tape 5 into the recesses 11 formed in the rotary cylinder 2, while smoothing the flow of air in the recesses 11, 11'. This in turn protects the magnetic tape against damage and suppresses the vibration of the magnetic tape 5 thereby ensuring a high quality of the reproduced image.

Figure 5:
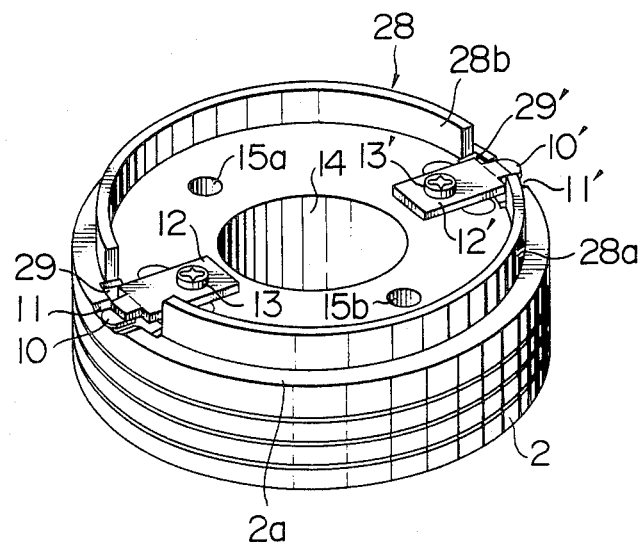
FIG. 5 is a perspective view of a rotary cylinder incorporated in the second embodiment of the rotary cylinder device of the invention, taken in the direction of arrows V—V of FIG. 6.
Figure 6:
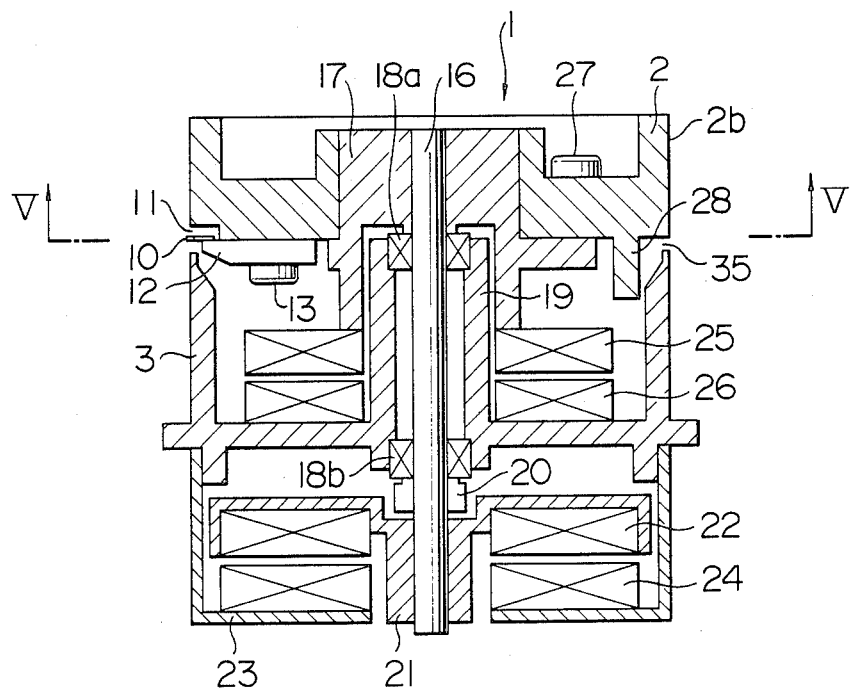
FIG. 6 is a vertical sectional view of the whole portion of the second embodiment taken along the axis thereof.
Figure 7:
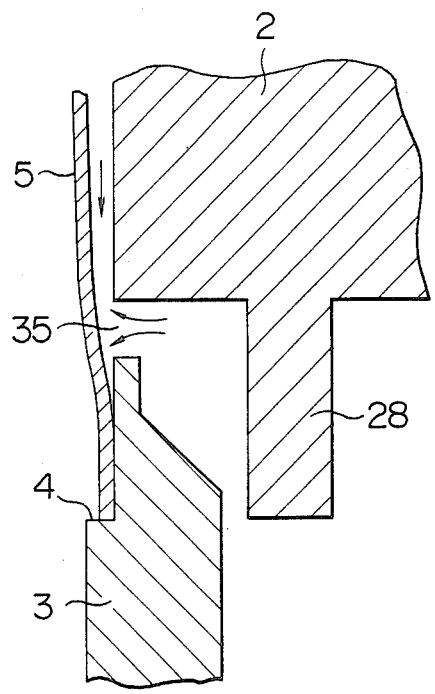
FIG. 7 is a enlarged sectional view of an portion of the second embodiment.

As shown in FIGS. 5 and 6, the rotary cylinder device has an annular shielding wall generally designated by the reference numeral 28 formed on the bottom surface 2a of the rotary cylinder 2. The annular shielding wall 28 has two diametrically opposed cut-outs which provide the spaces for mounting the magnetic heads 10, 10'. Thus, the annular shielding wall 28 has two arcuate wall sections 28a, 28b separated from each other by the cut-outs. The cut-outs in the annular shielding wall 28 are provided with clearance grooves 29, 29' which make it possible to precisely fix the head bases 12, 12' to the rotary cylinder 2 in close contact with the bottom surface 2a of the latter. As shown in FIG. 6, the annular shielding wall 28 extends from the bottom surface 2a of the rotary cylinder 2 towards the stationary cylinder 3 in the direction of the axis of the rotary shaft 16 of the rotary cylinder 2, so as to cover the small gap 35 between the rotary cylinder 2 and the stationary cylinder 3, in such a manner that the outer peripheral surface of the annular shielding wall 28 faces the inner peripheral surface of the stationary cylinder 3. Therefore, the annular shielding wall 28 seals the interior of the rotary cylinder device 1 accommodating the head bases 12, 12', rotary transformer 25, 26 and other parts from the outer peripheral surface 2b of the rotary cylinder on which the magnetic tape is wound. This arrangement effectively prevents the fluctuation of air pressure in the rotary cylinder device 1 from being transmitted to the outer peripheral surface of the rotary cylinder device 1, while preventing external air from flowing into the rotary cylinder device 1 through the small gap 35 due to a rise in the pressure of air between the magnetic tape 5 and the rotary cylinder device 1, as will be understood from FIG. 7. Consequently, a stable layer of air is formed between the outer peripheral surface of the rotary cylinder device 1 and the magnetic tape 5, so that the magnetic tape 5 is stably held in a floating condition slightly above the outer peripheral surface of the rotary cylinder device 1.

Figure 8:
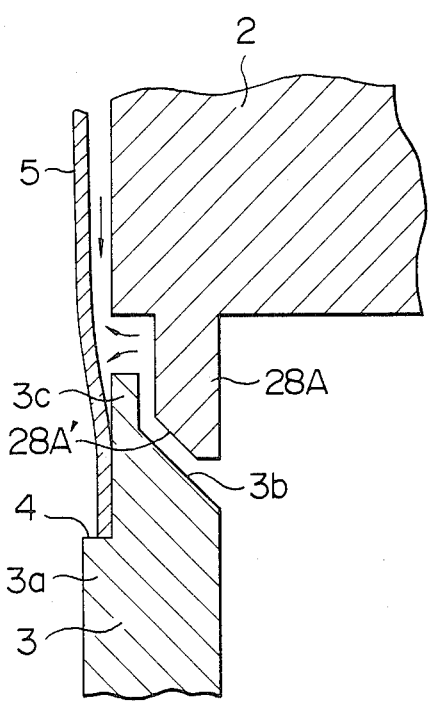
FIG. 8 is a view similar to FIG. 7, showing a modification of the arrangement of FIG. 7.

In FIG. 8, the sealing wall 28A has a free end surface 28A' which is substantially complementary to the end surface 3b of the peripheral wall 3a of the stationary cylinder 3 adjacent the rotary cylinder 2. More specifically, the end surface 3b and the free end surface 28A' are tapered inwardly and downwardly of the rotary cylinder device 1 so as to face each other. Additionally, the outer peripheral surface of the shielding wall 28A faces the inner peripheral surface of thin-walled upper end portion 3c of the peripheral wall 3a of the stationary cylinder 3. According to FIG. 8, since the shielding wall 28A is disposed more closely to the peripheral wall 3c of the stationary cylinder 3 than in the embodiment shown in FIG. 7, the advantageous effect of the embodiment described in connection with FIG. 7 can be further increased. It will be clear to those skilled in the art that the illustrated forms of the shielding wall 28 or 28a are only illustrative and various other forms are adoptable equally well provided that they can produce the shielding effect for sealing the small gap 35 between both cylinders 2,3 so as to prevent the flow of air into and out of the rotary cylinder device through the small gap 35.

The construction of FIGS. 5-8 offers, besides the advantages brought about by the construction of FIGS. 1-4, an additional advantage in that the magnetic tape 5 can be stably held during running not only in the regions where the recesses 11 are formed but also on other portions of the outer peripheral surface of the rotary cylinder device 1, thereby assuring a stable scanning by the magnetic heads 10, 10' and, hence, a further improvement in the quality of the reproduced image.

What is claimed is:

1. A rotary head device comprising: a rotary cylinder having an axis of rotation and arranged in opposition to a stationary cylinder in a direction of an axis of rotation with a small gap therebetween, said rotary cylinder having an end surface facing said stationary cylinder and an outer peripheral surface, and recesses formed in said end surface and opening in said outer peripheral surface so as to extend radially inwardly therefrom over a small distance, each of said recesses having a leading end wall and a trailing end wall as viewed in a direction of rotation of said rotary cylinder; magnetic head fixed to said rotary cylinder and positioned in said recesses and having outer extremities projecting beyond said outer peripheral surface of said rotary cylinder; wherein a distance between said leading end wall and said trailing end wall of each recess progressively decreases in a direction toward said axis of rotation of said rotary cylinder so that the distance is greatest at the outer end of said recess adjacent said magnetic head and smallest at an inner end of said recess remote from said magnetic heads.

2. A rotary head device according to claim 1, wherein said leading and trailing end walls of said recesses are flat and tapered so that each recess has a substantially trapezoidal configuration when viewed from the outer peripheral side toward the radially inner side.

3. A rotary cylinder device according to claim 1, wherein said rotary cylinder includes a shielding wall extending in the direction of said axis of rotation of said rotary cylinder from said end surface of said rotary cylinder into said stationary cylinder, so as to cover said small gap between said rotary cylinder and said stationary cylinder.

4. A rotary cylinder device according to claim 3, wherein said shielding wall includes a free end surface having a shape complementary to an end surface of a peripheral wall of said stationary cylinder disposed in opposition to said rotary cylinder, said free end surface being positioned adjacent to said end surface of said stationary cylinder.

* * * * *